JAMES Y. SITTON.
Improvement in Carriage-Wheels.
No. 114,058. Patented April 25, 1871.
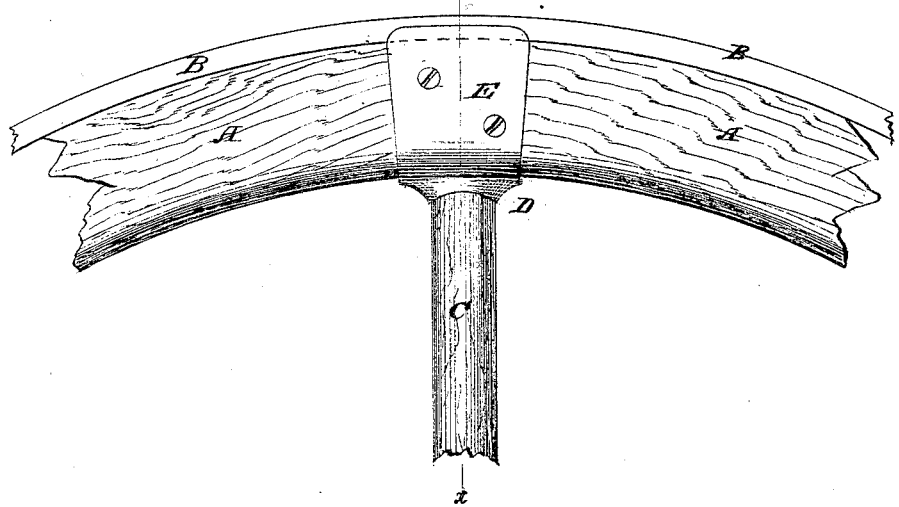
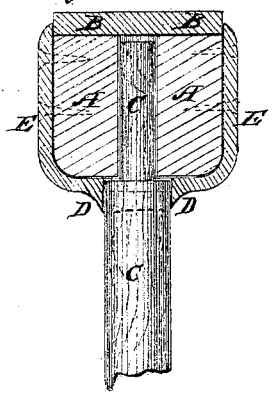

United States Patent Office.

JAMES Y. SITTON, OF DUE WEST, SOUTH CAROLINA.

Letters Patent No. 114,058, dated April 25, 1871.

IMPROVEMENT IN CARRIAGE-WHEELS.

The Schedule referred to in these Letters Patent and making part of the same.

*To all whom it may concern:*

Be it known that I, JAMES Y. SITTON, of Due West, in the county of Abbeville and State of South Carolina, have invented a new and useful Improvement in Carriage or Wagon-Wheels; and I do hereby declare that the following is a full, clear, and exact description thereof, which will enable others skilled in the art to make and use the same, reference being had to the accompanying drawing forming part of this specification.

This invention relates to improvements in wagon-wheels; and

It consists in a metal socket or collar for the spokes and a clamp for the felly and tire, made in one piece, and arranged for holding the spoke, felly, and tire securely together, one being applied at each spoke, all as hereinafter described.

Figure 1 is a side elevation of a part of a wheel showing my improved attachment, and Figure 2 is a transverse section of the same on the line *x x*.

Similar letters of reference indicate corresponding parts.

A is the felly;

B, the tire; and

C, the spoke.

D is a cast-metal malleable-iron ring, having a hole for the end of the spoke, and a flange, E, on the opposite sides, bent down so as to receive the felly between them when the ring is seated on the felly. Said flanges extend far enough to receive the tire between them also, and being screwed or riveted to the felly, as clearly indicated, hold them so that they cannot shift on each other laterally, while the ring holds the spoke, which may also be tenoned into the felly, as shown.

These attachments may be stamped up from wrought metal if preferred.

Having thus described my invention,

I claim as new and desire to secure by Letters Patent—

The metal socketed ring D, having the flanges E applied to the spoke, felly, and tire, substantially as specified.

JAMES Y. SITTON.

Witnesses:
J. L. MILLER,
J. W. LEE.